United States Patent [19]
Galazin

[11] Patent Number: 5,924,426
[45] Date of Patent: Jul. 20, 1999

[54] COSMETIC PERSONAL COLOR ANALYSIS METHOD AND KIT USING VALUE SCALE, COLORS AND CHARTS

[76] Inventor: Norma Galazin, P.O. Box 78, Menan, Id. 83434

[21] Appl. No.: 08/842,851

[22] Filed: Apr. 17, 1997

[51] Int. Cl.⁶ .................................................. A45D 44/00
[52] U.S. Cl. ...................... 132/200; 434/100; 132/286; 132/333
[58] Field of Search .................. 434/99, 100; 132/200, 132/286, 333, 319

[56] References Cited

U.S. PATENT DOCUMENTS

| | | | |
|---|---|---|---|
| 2,221,774 | 11/1940 | Bowser | 434/99 |
| 3,596,390 | 8/1971 | Scalice | 434/100 |
| 4,160,271 | 7/1979 | Grayson et al. | 434/100 |
| 4,561,850 | 12/1985 | Fabbri et al. | 434/100 |
| 4,681,546 | 7/1987 | Hart . | |
| 4,842,523 | 6/1989 | Bourdier et al. | 132/200 |
| 5,178,169 | 1/1993 | Lamie | 434/100 |
| 5,311,293 | 5/1994 | Mac Farlane et al. | 434/100 |
| 5,562,109 | 10/1996 | Tobiason | 434/100 |

OTHER PUBLICATIONS

Color Me Beautiful, by Carole Jackson, 1980, pp. 25–59.
Color for Men, by Carole Jackson with Kalia Lulow, 1984, pp. 21–57.

*Primary Examiner*—Todd E. Manahan
*Attorney, Agent, or Firm*—John R. Ley

[57] ABSTRACT

The personal colors for facial cosmetics are determined by a method and a kit of equipment which determines an overall value for the individual by reference to skin, eye and hair features, determines a hue of the individual by reference to colors such as facial powders applied to the skin, and presents the personal colors based on the overall value and hue determined. A value determining scale is used to determine specific values of features by adjacent comparison to those features. An overall value chart contains information defining an overall value based on a predetermined multiple number of specific values of features. A personal color direction chart correlates values and hues to the desired personal colors.

23 Claims, 2 Drawing Sheets ial color analysis to determine the most flattering and enhancing colors for an individual to wear in cosmetics and makeup. More particularly, the present invention relates to a new and improved method and a kit of equipment which allows an individual's personal colors to be determined for cosmetics and makeup in a relatively effective, convenient, straightforward, non-complicated and immediate-result oriented manner.

BACKGROUND OF THE INVENTION

For many years, personal color analysis has been employed to assist individuals in selecting cosmetics and makeup, such as lipstick, lip liner, blush, and the like which are worn on the face. Women use personal color analysis to select cosmetics for everyday and specialized uses. Men may also use personal color analysis for makeup worn in theatrical, stage and television appearances, for example. Personal colors for cosmetics and makeup are primarily related to the skin, hair and eye colors.

In general, the objective of personal color analysis is to identify those colors which most naturally blend with and compliment the natural coloration of the individual. The individual's personal colors, when worn in makeup and cosmetics, enhance natural beauty and attractiveness. The proper personal colors cause the individual to stand out and enhance the individual's presence and persona. Incorrect colors, which complement the individual's proper personal colors, will overpower the individual, or make her appear sallow, weakened or withdrawn, thereby detracting from her natural attractiveness.

In the past, personal colors have been characterized into four groups, each of which has been identified with a season of the year. A person with personal colors of golden undertones was considered as having "spring" or "autumn" coloration, while a person having blue undertones was regarded as having "summer" or "winter" coloration. Associating colors with each season is an oversimplification because different individuals have a wide variety of different colorations and undertones. Consequently, it can be difficult for even a practiced beauty consultant to identify the correct personal colors, and it is not unusual that mistakes are made.

The original method of personal color analysis involved subjective evaluations made by beauty consultants, possibly with the aid of color drapes and color charts. Such consultants attempted to become proficient and experienced in personal color analysis by analysis of many individuals. Typically these consultants draped a white or neutral colored cloth or smock over the shoulders of the individual to prevent the wardrobe from influencing the color of the individual's face, eyes and hair. Thereafter the consultant used swatches to aid in making the color determinations, or simply made mental evaluations. However, in the end a great deal of subjective judgment was required. Of course, this type of personal color analysis was only as effective as the skill of the consultant. Frequently, personal color analysis suffered as a result of judgments made by inexperienced consultants.

Recognizing the variability of a subjective personal color analysis by consultants, the next evolution in the field of personal color analysis was a computer color analysis system. To use the computer color analysis system, a beauty consultant attempted to match the skin, hair and eye color features of the individual with certain color chips that were recognized and coded for use in a computer color analysis program. Based on the selected color chips, the computer system developed a list of the personal colors. The difficulty with the computer color analysis system is that it also required subjective judgment in matching a relatively large number of color chips to the individual's facial skin, hair and eyes. The hair and eye colors typically include a variety of different colors, so matching the chips with the hair and eyes could be difficult and time-consuming. Furthermore, the information was processed by a computer that was not located on the premises of the beauty consultant, thereby potentially delaying the time when the results were available. This time delay could be a discouragement and hindrance. In a surprising number of situations the computer personal analysis system did not assess the individual's best personal colors, perhaps because of the subjective aspects of matching one of a relatively large number of color chips to the individual's different features.

Throughout this evolution of personal color analysis, there has been a continual need for a reliable, effective, simple-to-use, relatively-inexpensive and immediate-result oriented technique for determining personal colors, which can be used by relatively inexperienced beauty consultants who do not have the experience and skill to make effective subjective color evaluations. It is with respect to these and other background considerations, and the continuing unresolved need for such a simplified but effective personal color analysis technique, that the present invention has resulted.

SUMMARY OF THE INVENTION

One significant aspect of this invention relates to an effective, reliable, inexpensive, simple-to-use and immediate-result oriented method for correctly identifying an individual's personal colors for cosmetics and makeup. Another aspect of this invention relates to a kit of equipment which can be used by a personal color consultant or the individual herself or himself to effectively determine personal colors. Another aspect of this invention relates to performing personal color analysis in a relatively easy to use and immediate-result oriented manner, thereby avoiding the costs and delays in time to obtain a more complex computer personal analysis.

In accordance with these and other aspects, the present invention relates to a method of determining personal colors for facial cosmetics for an individual. The steps of the method include determining an overall value for the individual by reference to at least skin and hair features of the individual; applying at least two different predetermined colors to the skin of the individual, determining a hue of the individual by reference to the colors applied to the skin; and determining the personal colors of the individual based on the overall value and hue determined. Preferred additional steps of the method include determining a specific value level for each of the skin, eye and hair features of the individual, and determining the overall value based on the specific value levels of the features. In addition, each specific value level may be grouped into a light, medium or dark value group from which the overall value is determined by the number of occurrences of each value group. Determining the overall value may further be achieved by correlating the category of the overall value and the determined hue with information contained in an overall value chart. The two different predetermined colors are preferably selected to represent opposite extremes of a warm-cool spectrum of colors, and those colors may be a red yellow color and a red purple color. Further, a third color at a midpoint of the warm-cool spectrum, for example a red color, may also be used.

A kit of equipment constitutes another aspect of the present invention. The kit is used to determine the personal colors. The kit comprises a value determining scale, such as a grey scale having information representing a plurality of different shades of grey between white and black, allowing the shades to be compared to the features of the individual for value. The grey scale is of a size to permit the grey scale to the placed adjacent to the features during the comparison. An overall value chart contains information defining an overall value of the individual based on a predetermined multiple number of specific value levels of features. At least two, and preferably three, different predetermined colors are included in the kit for application to the skin. The colors represent a continuum of the extremes of a warm-cool spectrum of colors. A personal color direction chart is further included in the kit, and the personal color direction chart contains information which correlates values and hues to personal colors. The colors are preferably red yellow, red purple and red, and the colors are preferably supplied as facial powders.

Both the method and the kit of the present invention may be used relatively simply by a consultant or by the individual herself or himself with a modest degree of experience to obtain reliable and effective personal color analysis results. Furthermore the relative cost of the kit and the ease in which it may be used are considerably more attractive than the expense, delay and uncertainty associated with a computer color analysis system. Further still the results of using the present invention are considerably more reliable than the purely subjective approaches which have been used in the past.

A more complete appreciation of the present invention and its scope can be obtained by reference to the accompanying drawings, which are briefly summarized below, to the following detailed description of presently preferred embodiments of the invention, and to the appended claims.

DETAILED DESCRIPTION

Figure 1:
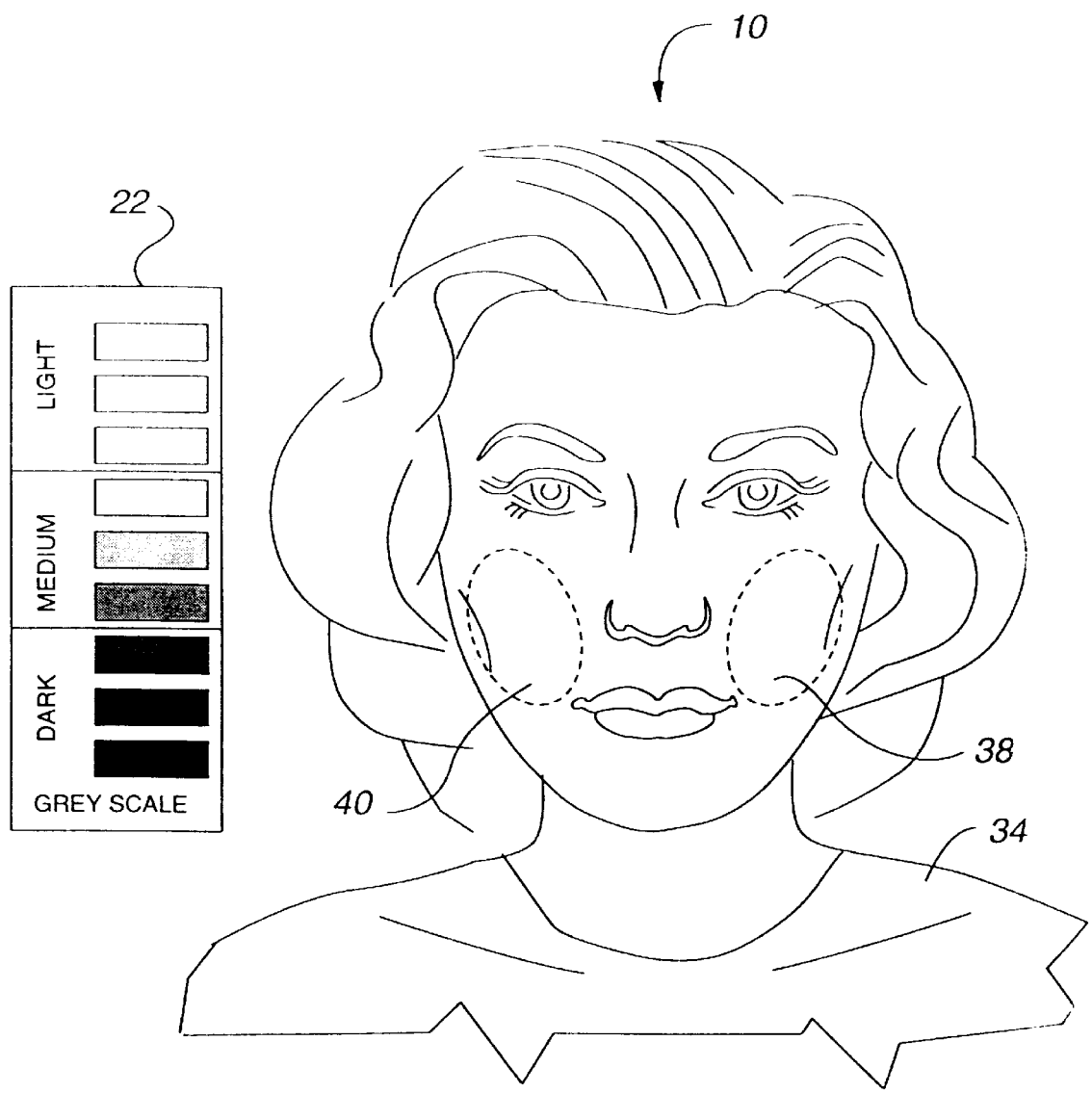
FIG. 1 is an illustration of a person or an individual upon which the method of personal color analysis is performed.

The present invention relates to a method of personal color analysis for an individual, such as the individual 10 shown in FIG. 1. Generally, the individual's "personal colors" are used to determine color selections for cosmetics and makeup to be worn by the individual 10. The personal colors are directly related to the individual's personal features such as skin, eye and hair color as well as the relative intensity or "value level" of the colors of these features.

Figure 2:
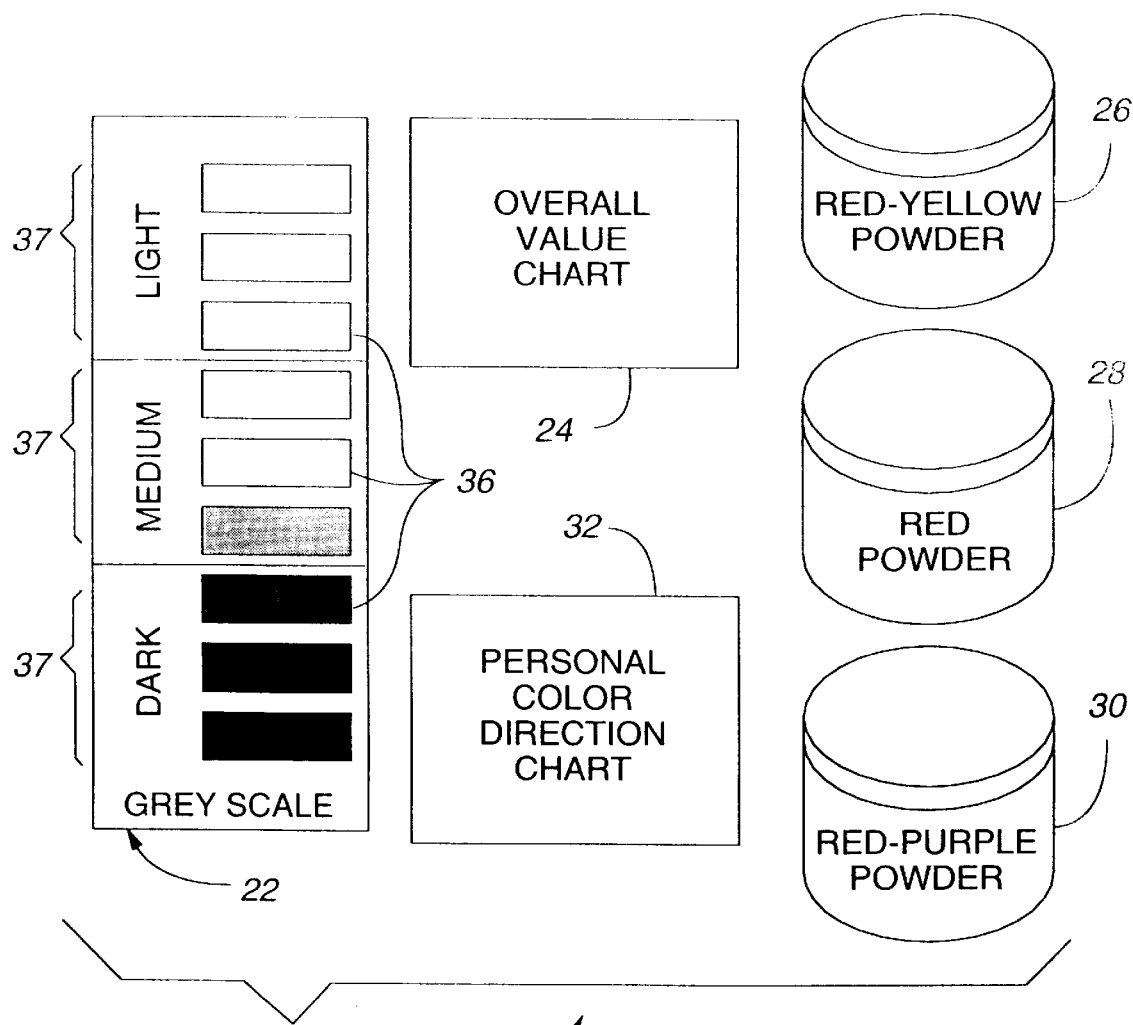
FIG. 2 is an illustration of a kit of equipment for practicing the method of personal color analysis on the individual shown in FIG. 1.
Figure 3:
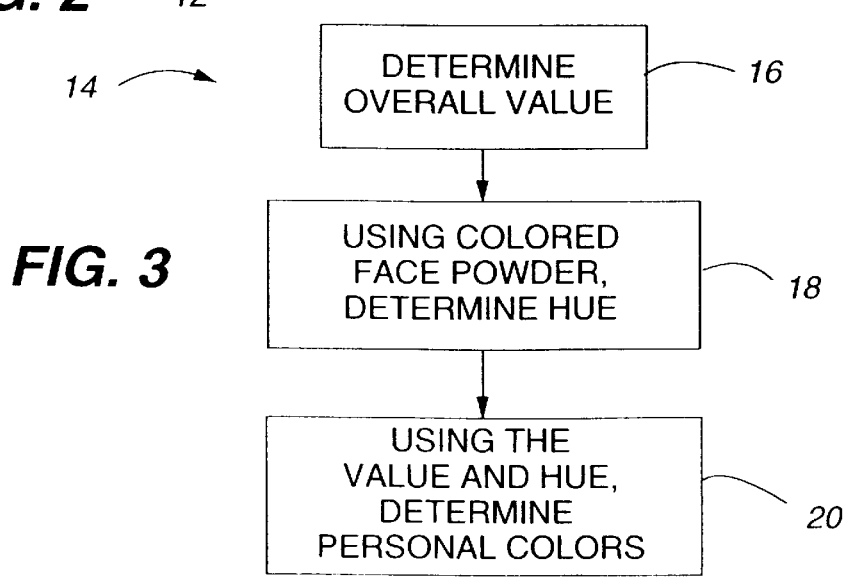
FIG. 3 is a flow chart depicting steps taken in performing the method of personal color analysis on the individual shown in FIG. 1 and using the kit shown in FIG. 2.

In general, a kit 12, shown in FIG. 2, is used to determine the individual's personal colors, by practicing a method shown generally at 14 in FIG. 3. The method 14 comprises three basic steps: determining the individual's "overall value" (step 16), determining the individual's "hue" (step 18) and determining the individual's personal colors based on value and hue (step 20).

The kit 12 comprises a grey scale card 22 or other value determining scale which is used to determine the relative lightness or darkness of features of the individual 10 such as skin, hair and eyes during the performance of method step 16. The value levels determined for each of these features are correlated by the information contained in an overall value chart 24 to determine the "overall value" of the individual 10. The kit 12 further comprises face powders 26, 28 and 30 of three different predetermined colors which are used in performing the method step 18 to determine the individual's hue. At least two of the colors are applied to the individual's skin, usually facial skin, to distinguish very effectively between personal colorations based on a warm-cool spectrum of colors. Additionally, the kit 12 includes a personal color direction chart 32 for use in the last method step 20. The personal color direction chart 32 contains information by which to determine thus individual's personal colors based on the overall value and hue determined in method steps 16 and 18, respectively.

Before beginning the method 14 to determine the personal colors, a preliminary step should be performed to eliminate or minimize possible color distractions. Removing color distractions allows for better results since some of the steps of the method 14 require a modest amount of subjective evaluation. Any color distractions, such as colored clothing, colored backgrounds, or colored lighting should be eliminated or minimized to prevent confusion as to color interaction. For this reason, a white or neutral colored cloth or smock 34 (FIG. 1) should be draped over the individual to cover any colored clothing. Also, distracting background colors should be either removed or minimized by placing neutral or white colors in the background. Additionally, for best results, the individual's makeup and jewelry should be removed to avoid possible distractions. Once the preliminary step of preparation is complete, the method 14 for determining the personal colors of the individual 10 may be commenced.

The individual's overall value is determined in method step 14 by first determining the respective color "values" or value levels of the individual's features such as the skin (primarily facial), hair and eyes. Generally, a color's value level is the lightness or darkness of the color. One way to conceptualize color value is by analogy to a black and white photograph. A black and white photograph displays all colors in shades of grey. The light colors appear as a light grey and darker colors appear as a darker grey. Thus, all colors can be represented in terms of a conventional "grey scale" such that one can determine approximately where on the grey scale the value level of each color fits.

The specific value level of each feature is determined by using a value determining scale, such as the grey scale card 22, included in the kit 12. The grey scale card 22 is a conventional grey-scale that comprises several printed shades 36 of grey ranging between white and black. The shades 36 are divided into three value groups 37: light, medium and dark. The shades 36 and value groups 37 allow the consultant to classify the value level of different features of the individual 10.

Although the preferred kit 12 comprises the grey scale 22 of multiple values or shades 36 of the color grey, other primary and secondary colors could be used in an equivalent value determining scale. The equivalent value determining scale would be formed by multiple different shades of a single primary or secondary color ranging from light to dark or white to black. For example, an equivalent scale of varying values could be constructed using the color blue wherein the values would range from very light blue to very dark blue.

To determine the specific grey scale value levels for each individual feature, the grey scale card 22 is held near the feature, for example the skin, of the individual 10 so that direct comparisons can be made, as illustrated in FIG. 1. Visually comparing the different shades 36 of grey on the grey scale card 22 with the feature enables the user to make a determination as to which shade 36 most nearly matches the feature. Once the shade 36 has been determined the value level of the feature is placed into one of the value groups 37.

After the skin value level is determined, specific value levels for the hair and eyes are determined in the same manner. That is, the grey scale card 22 is held near the hair and eyes, in turn, and specific value levels are chosen for each. From the specific value levels, the value group for each feature is then chosen. The specific value levels for the skin, hair and eyes are independent of each other, allowing the specific value levels and value groups for these features to be determined in any order.

Once the specific value levels for each of the individual features are determined, an overall value for the individual 10 must be determined. A person's "overall value" is distinguishable from an individual feature's specific value level. The overall value represents the combination of color value groups of a person's features. The information contained in the overall value chart 24 allows the consultant to use the separately determined individual feature value groups to establish an overall value for the individual 10. The information in the overall value chart 24 may be represented in different formats, two of which are reproduced below as Tables 1 and 2. That is, the information in one or both of the Tables 1 and 2 may be printed on the overall value chart 24. Using the value groups for the individual features, Tables 1 and 2 yield an overall value for the individual 10 of a category which is either Light, True, Vivid or Contrasting.

TABLE 1

|  | Light Skin | Medium Skin | Dark Skin |
|---|---|---|---|
| Light Hair and Light Eyes | Light | Light | Contrasting |
| Light Hair and Medium Eyes | Light | True | Contrasting |
| Light Hair and Dark Eyes | Contrasting | Contrasting | Contrasting |
| Medium Hair and Light Eyes | Light | True | Contrasting |
| Medium Hair and Medium Eyes | True | True | Vivid |
| Medium Hair and Dark Eyes | Contrasting | Vivid | Vivid |
| Dark Hair and Light Eyes | Contrasting | Contrasting | Contrasting |
| Dark Hair and Medium Eyes | Contrasting | Vivid | Vivid |
| Dark Hair and Dark Eyes | Contrasting | Vivid | Vivid |

TABLE 2

| Light | 2 Lights and 1 Medium | 3 Lights |  |
|---|---|---|---|
| True | 2 Mediums and 1 Light | 3 Mediums |  |
| Vivid | 2 Mediums and 1 Dark | 1 Medium and 2 Darks | 3 Darks |
| Contrasting | 1 Light, 1 Medium and 1 Dark | 2 Darks and 1 Light | 1 Dark and 2 Lights |

Tables 1 and 2 are alternative versions of the same information contained in the overall value chart 24 of kit 12. Each Table 1 or 2 can be used independent of the other and each will give the same overall value using the same three independently derived grey scale value groups for the hair, eyes and skin.

As will be noted from Tables 1 and 2, it may not be necessary to always "value" all features in order to determine the individual's overall value. If one feature of the individual 10 was in a light value group and the second feature was in a dark value group, then the individual's overall value would be "contrasting" and the third feature need not be analyzed. However, any other combination of the first two determined value groups (two lights, two darks, two mediums, one medium and one dark, or one medium and one light) requires that the third feature be analyzed to determine the proper overall value or category.

With the overall value determined, the next method step 18 is to determine the individual's hue. "Hue" typically describes the color itself (e.g. red) independent of its intensity. A particular color may be lightened or darkened resulting in different value levels, but the hue remains the same. The individual's hue is determined by applying two or three colors, preferably the colored powders 26, 28 and 30, to the cheeks 38 and 40 of the individual 10 and determining which color looks the best or most natural.

Typically a powder base should be applied to the cheeks before application of the colored powders 26, 28 and 30. The powder base is selected to represent the individual's natural skin tone. When applied, the powder base covers minor skin color variations and blemishes. The powder base allows the colored powder to blend with or contrast to the natural skin tones of the individual 10 so that a more effective determination of hue can be made. After applying the powder base, the face powders 26, 28 and 30 can be applied on top of the powder base.

The face powders 26, 28 and 30 are three predetermined colors, which represent two ends and a middle of a color spectrum ranging from "cool" to "warm." The two ends of the cool-warm spectrum are generally purple and yellow using Munsell hue notation. The middle colored powder 28 represents a color near the middle of the spectrum between the two ends or extremes. The middle color is preferably red because red is a "universal" color, i.e., a primary color found in all skin types. Further, since cool skin tones contain blue in combination with red, and since warm skin tones contain yellow in combination with red, the cool and warm colors are chosen to be variations of red towards these two ends or extremes of the warm-cool spectrum of colors. That is, since blue, red and yellow are the three primary colors of the color spectrum, if red is in the middle then blue and yellow are by definition at the ends or extremes of the spectrum. Therefore, variations of red towards the extremes consist of red mixed with blue on the one hand and red mixed with yellow on the other hand, e.g., red purple and red yellow respectively.

The colored powder 26 represents one such "extreme" color variation, i.e., red yellow (relatively equal portions of red and yellow combined.) The colored powder 30 represents the other extreme color variation, i.e., red purple (red mixed with some blue). These colored powders allow the consultant to determine the personal colors for the individual 10 by applying them to the skin and determining which color looks the most natural. Typically the red yellow colored powder 26 should be applied to one cheek 38 or 40 and the red purple colored powder 30 should be applied to the other cheek. Choosing the red yellow and red purple colors in the first instance prevents the choice of two colors that are too close together in the color spectrum. Choosing colors too similar increases the difficulty in determining which is correct or "best" and thus increases the overall margin of error.

After both areas 38 and 40 are colored with the powders 26 and 30, a determination must be made as to which color looks better with respect to the individual's natural skin tones, hair color and eye color. The colored powder that looks the best will be the most natural and will blend with the skin color of the individual 10 while the other colored powders will not look natural or blend with the skin color. By comparing and contrasting the two colors on the individual's face, a subjective determination can be made as to which color looks better. The better color will look more natural, bringing out the natural skin color and enliven the persona of the individual 10. The worst color between the two will drain color from the face and will appear unnatural causing the skin to look generally dull and unhealthy.

Typically, one of the two extreme colored powders 26 and 30 will look more natural on the individual 10. If one color looks like the "best" color then the hue of the individual 10 has been determined.

If neither color appears particularly attractive, or if it is determined that a check should be conducted of the previous correct determination, the "worst" or least flattering color is removed from its respective skin area 38 or 40, and the middle colored powder 28 is applied to the area 38 or 40, after applying more powder base. Another comparison of the two colors on the areas 38 and 40 is made. The best of the two colors is then selected. The best and most natural looking of the three colored powders 26, 28 and 30 on the individual 10 i.e., the color that looked the best on the individual 10, describes the individual's hue. By determining which color looks the most natural on the individual will allow the consultant to categorize the individual as either belonging to the Red Purple Group, the Red Group or the Red Yellow Group.

Determining a hue group in this manner is more simple than determining the individual's exact color or hue as in previous methods of personal color analysis. With only three choices the hue can be determined in less time and more accurately. Also, since the colors 26, 28 and 30 represent the end and middle points of the warm-cool spectrum of actual skin tones, it is relatively easy to determine which one is the best of the three. In all, the process is faster and generally more accurate since less dependence is placed on the skill of the consultant.

The last method step 20 involves using the individual's overall value and hue to determine their personal colors using the personal color direction chart 32. The chart 32 is typically set up in a matrix or grid, such as shown in Tables 3 and 4, wherein the different hues are aligned along one axis and the overall values are aligned along the other axis. Using this matrix, the overall value and hue of the individual 10 become coordinates to locate the appropriate colors for the individual 10.

For example, if the individual 10 has an overall value of "Light" and is in the Red Yellow Group, then the personal colors are Red Yellow-Red and Red Yellow for facial cosmetics.

TABLE 3

|  | Red Purple Group | Red Group | Red Yellow Group |
| --- | --- | --- | --- |
| Light | Light Red Purple and Light Red Purple - Red | Light Red - Red Purple, Light Red and Light Red - Red Yellow | Light Red Yellow - Red and Light Red Yellow |
| True | Medium Red Purple and Medium Red Purple - Red | Medium Red - Red Purple, Medium Red and Medium Red - Red Yellow | Medium Red Yellow - Red and Medium Red Yellow |
| Vivid | Dark Red Purple and Dark Red Purple - Red | Dark Red - Red Purple, Dark Red and Dark Red - Red Yellow | Dark Red Yellow - Red and Dark Red Yellow |
| Contrasting | Bright Red Purple and Bright Red Purple - Red | Bright Red - Red Purple, Bright Red and Bright Red - Red Yellow | Bright Red Yellow - Red and Bright Red Yellow |

Additionally, the following eyeshadow chart can be used to determine which color of eyeshadow compliments the individual's natural features. This chart is based on the individual's hue as in Table 3, however no distinction is made as to the overall value.

TABLE 4

| Red Purple Group | Red Group | Red Yellow |
| --- | --- | --- |
| Red Purple and Red Purple - Red | Red - Red Purple, Red and Red - Red Yellow | Red Yellow - Red and Red Yellow |

In reference to the color designations in the color direction chart, the initial color or color combination represents the primary component of hue. A secondary color component is separated from the primary component by a hyphen, and the secondary color component is of a lesser contribution to the overall hue compared to the primary component.

The color direction chart 32 has been developed to help the consultant determine the personal colors for the individual 10 based on their overall value and hue. The chart 32 is simple to read and the personal colors easily determined once the overall value and hue are determined. Simply finding the intersection where the determined hue or color Group column meets the determined overall value row yields the correct personal colors. for the individual 10. The colors located at this intersection represent the groups of colors for facial cosmetics which the individual 10 can wear without negative effects, such as the draining of the color from the face.

The method 14 allows one to determine the individual's personal colors with ease and accuracy. The method is easy to use since each of the first two method steps 16 and 18 requires only the determination of the correct information based on a direct comparison to the shades on the grey scale 22 and the three colored powders 26, 28 and 30. Furthermore, the charts 24 and 32 are simple to use and easy to understand.

No computers are required so that learning the system is simplified and the kit 12 remains relatively inexpensive. The method 14 is also more accurate than subjective color determinations where colors are held near the face of the individual since the colored powders 26, 28 and 30 actually blend with the skin colors disclosing the best hue of the individual 10. The face powders are specially designed to eliminate many of the subjective determinations, making the best color apparent.

Although the "consultant," referred to above, is the person who typically performs the method 14 on the individual 10, the kit 12 also allows the individual whose personal colors are to be determined to also perform the method 14 on herself or himself.

A presently preferred embodiment of the present invention and many of its improvements have been described with a degree of particularity. This description is of a preferred example for implementing the invention, but the scope of the invention should not necessarily be limited by this description. The scope of the present invention is defined by the following claims.

The invention claimed is:

1. A method of aiding personal color selection for facial cosmetics for an individual, comprising the following steps:

comparing the skin and hair features of the individual to a value determining scale;

assigning an overall value for the individual based on the comparison of the skin and hair features of the individual to the value determining scale;

applying at least two different predetermined colors to the skin of the individual;

selecting the two different predetermined colors to represent a warm color and a cool color respectively from a warm-cool spectrum of colors;

comparing a hue of the individual to the two different predetermined colors applied to the skin;

providing a personal color direction chart containing information which correlates overall values and hues to personal colors; and locating on the personal color direction chart at least one personal color of the individual based on the overall value of the individual and the comparison of the hue of the individual to the two different predetermined colors.

2. A method as defined in claim 1 wherein the step of assigning an overall value for the individual comprises the following steps:

assigning a specific value level for each of the skin and hair features of the individual based on the comparisons of the skin and hair features to the value determining scale; and assigning the overall value based on the specific values of the skin and hair features.

3. A method as defined in claim 2 wherein the step of assigning an overall value for the individual further comprises the following steps:

grouping each specific value level into one of a light, medium or dark value group; and assigning the overall value from the number of occurrences of each value group.

4. A method as defined in claim 3 wherein the step of assigning an overall value further comprises the following steps:

providing an overall value chart containing information defining the overall value of the individual based on value groups of at least two features of the individual, the features including skin and hair; and locating on the overall value chart an overall value for the individual based on the value groups of the skin and hair features of the individual.

5. A method as defined in claim 3 wherein the step of assigning an overall value further comprises the following steps:

comparing the eye features of the individual to the value determining scale;

assigning a specific value level for the eye features of the individual; and grouping the specific value level for the eye features of the individual into one of a light, medium or dark value group.

6. A method as defined in claim 5 wherein the step of assigning an overall value further comprises the following step:

categorizing the overall value as one of light, true, vivid or contrasting, wherein the light overall value is defined by the occurrence of one of three light value groups or two light value groups and one medium value group, and wherein the true overall value is defined by the occurrence of one of three medium value groups or two medium value groups and one light value group, and wherein the vivid overall value is defined by the occurrence of one of two dark value groups and one medium value group or three dark value groups or two medium value groups and one dark value group, and wherein the contrasting overall value is defined by the occurrence of one of a singular occurrence of each value group or two dark value groups and one light value group or two light value groups and one dark value group or one dark value group and one light value group.

7. A method as defined in claim 6 wherein the step of assigning an overall value further comprises the following steps:

providing an overall value chart containing information defining the overall value of the individual based on value groups of three features of the individual, the features including skin, hair and eyes; and locating on the overall value chart an overall value for the individual based on the value groups of the skin, hair and eye features of the individual.

8. A method as defined in claim 1 wherein the personal color direction chart is configured as a grid defining a plurality of columns, a plurality of rows and a plurality of row/column intersections; one of each row or column representing information describing a different overall value; the other one of each row or column representing information describing a different hue; and each row/column intersection representing personal color information corresponding to the overall value and hue information of the row and column which form the intersection.

9. A method as defined in claim 1 further comprising the following steps:

removing color distractions by draping a neutral colored cloth over the individual to cover any colored clothing;

minimizing background colors by placing neutral colors in the background; and removing any make-us and jewelry from the individual.

10. A method as defined in claim 1 wherein the step of selecting the two different predetermined colors further comprises the following step:

selecting the two different predetermined colors to represent opposite extremes of the warm-cool spectrum of colors.

11. A method as defined in claim 1 wherein the two different predetermined colors are a red yellow color and a red purple color.

12. A method as defined in claim 1 wherein the step of applying at least two different predetermined colors further comprises the following steps:

applying three different predetermined colors to at least two different application areas on the facial skin of the individual; and selecting the three different predetermined colors to represent opposite extremes and a midpoint of a warm-cool spectrum of colors.

13. A method as defined in claim 12 wherein the three different predetermined colors are a red yellow color, a red purple color and a red color.

14. A method as defined in claim 12 wherein the step of applying the three predetermined colors further comprises the following step:

applying two of the three colors to exist simultaneously on the facial skin of the individual.

15. A method as defined in claim 14 wherein the step of applying the three predetermined colors further comprises the following steps:

applying a first one of the three colors to a first selected area of facial skin of the individual;

applying a second one of the three colors to a second selected area of facial skin of the individual;

removing one of the first or second colors from the respective selected area of facial skin; and applying a third one of the three colors to the selected area of facial skin from which the one of the first or second colors was removed.

16. A method as defined in claim 1 wherein the step of applying at least two different predetermined colors comprises the following step:

applying powders of the predetermined colors on opposite cheeks of the individual.

17. A kit for use in aiding personal color selection for an individual, comprising:

a value determining scale having information representing a plurality of different shades between white and black by which to compare to features of the individual for value level, the value determining scale having a predetermined size to permit the value determining scale to be placed adjacent to the features during the comparison;

an overall value chart containing information defining an overall value of the individual based on a predetermined multiple number of value levels of features of the individual;

at least two colored substances of different predetermined colors for application to the skin of the individual, the two different colors representing a warm color and a cool color respectively of a warm-cool spectrum of colors; and a personal color direction chart containing information which correlates overall values and hues to personal colors with each personal color defined by one overall value and one hue.

18. A kit as defined in claim 14, further comprising:

a third colored substance of a predetermined color representing a midpoint of the warm-cool spectrum of colors between the two different colors.

19. A kit as defined in claim 18, wherein the three colors are red yellow, red purple and red.

20. A kit as defined in claim 17, wherein the colored substances are facial powders.

21. A kit as defined in claim 17, wherein the color direction chart presents the information in the form of a grid having rows, columns and row/column intersections; one of the rows or columns representing information related to one or more shades of the grey scale; the other one of the rows or columns representing information related to each of the different colors; and the information represented by each row/column intersection forming personal color information determined by correlating the shades and the colors.

22. A kit as defined in claim 17, wherein the value determining scale is a grey scale having a plurality of different shades of grey between white and black.

23. A kit as defined in claim 17, wherein the two colors represent opposite extremes of the warm-cool spectrum.

* * * * *